Patented Mar. 27, 1923.

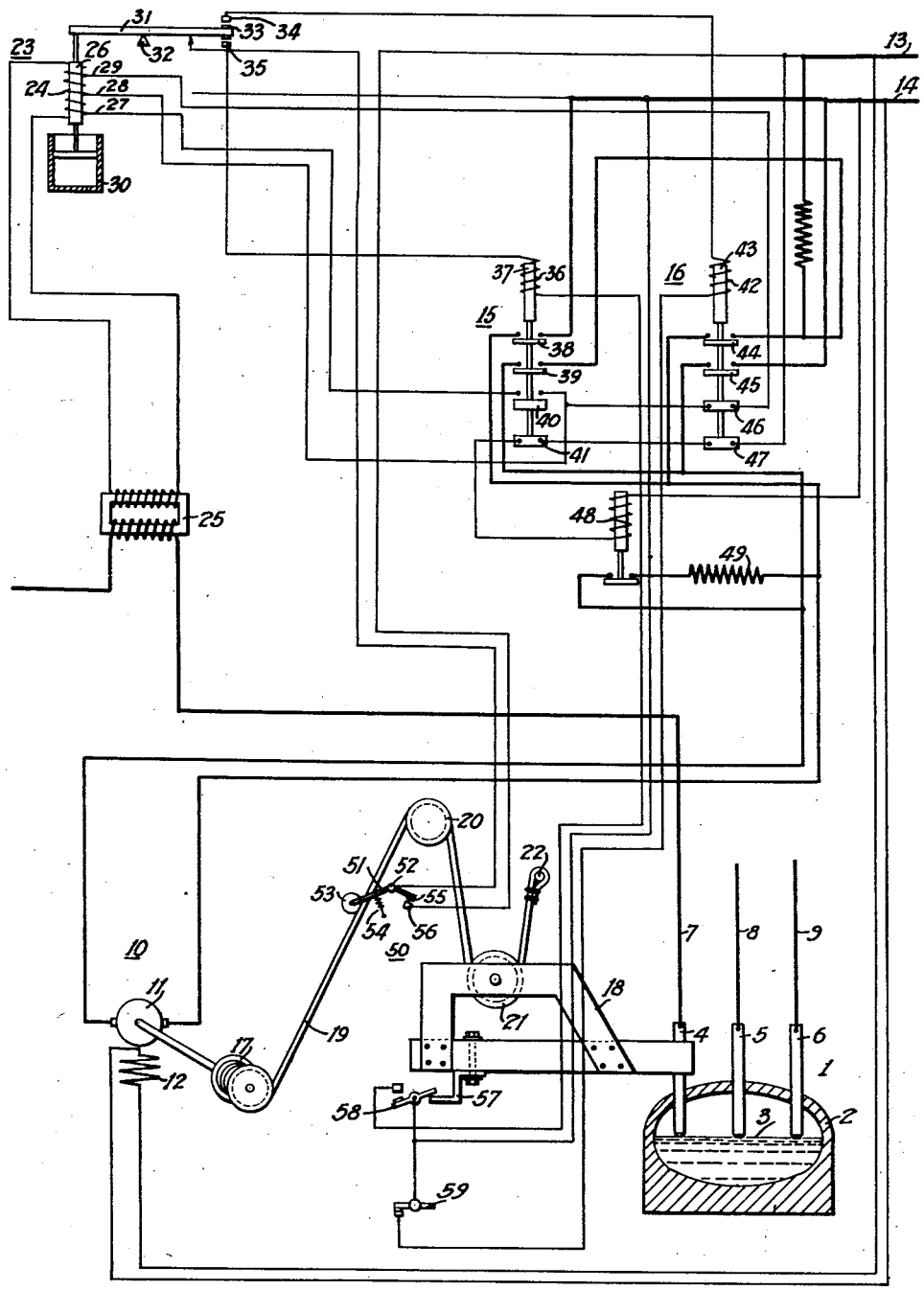

1,449,579

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

FURNACE-REGULATOR SYSTEM.

Application filed November 6, 1919. Serial No. 335,993.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Furnace-Regulator Systems, of which the following is a specification.

My invention relates to furnace-regulator systems and particularly to regulator systems for governing the movable electrodes of electric furnaces.

One object of my invention is to provide a furnace-regulator system that shall prevent the raising or the lowering of the electrodes beyond predetermined points and that shall prevent the operation of the electrode motor in case the movement of an electrode is so arrested as to produce slack in the cable connecting the electrode with the motor.

In operating electric furnaces of the movable-electrode type, it is very desirable to prevent raising the electrode beyond such predetermined point above the material being treated in the furnace as would open the electrode circuit and also to prevent so lowering the electrode that the electrode frame would engage the top of the furnace. Moreover, it is desirable to provide means for preventing further operation of the electrode motor in case the electrode is arrested while being lowered in the furnace.

In a furnace-regulator system constructed in accordance with my invention, a switch mechanism is so associated with the cable between the electrode motor and the electrode as to open the motor circuit whenever any slack occurs in the cable. Moreover, the supporting frame for each electrode is provided with means for operating switches in the extreme positions of the electrode to stop the motor and prevent operation of the electrodes beyond predetermined points.

The single figure of the accompanying drawing is a diagrammatic view of a furnace-regulator system constructed in accordance with my invention.

Referring to the drawing, an electric furnace 1, comprising a receptacle 2 containing a bath of material 3 and three movable electrodes 4, 5 and 6, is connected to a three-phase supply circuit comprising conductors 7, 8 and 9.

Each of the movable electrodes 4, 5 and 6 is provided with a motor for raising and lowering the electrode to maintain a substantially constant arc and a regulator for governing the operation of the motor in accordance with the current flowing through the electrode circuit. Inasmuch as the motors and regulators, which govern the operation of the movable electrodes, are similar in construction and operation, it is deemed sufficient to describe the construction and operation of but one motor and one regulator, namely, the motor and regulator which are associated with the movable electrode 4.

A motor 10, comprising an armature 11 and a field winding 12, is provided for raising and lowering the electrode 4. The field winding 12 is directly connected across an auxiliary supply circuit comprising conductors 13 and 14, and the armature 11 is selectively connected across the supply conductors 13 and 14 by means of switches 15 and 16. Any suitable connecting means may be provided between the motor 10 and the electrode 4 for effecting movement of the electrode in accordance with the operation of the motor.

In the system illustrated in the drawing, a winding drum 17, which is directly mounted upon the armature shaft of the motor 10, serves to raise and lower the electrode-supporting frame 18 by means of a cable 19. The cable 19 passes over a stationary pulley 20 and under a pulley 21 which is mounted upon the frame 18. The cable 19 is permanently connected to a stationary point 22. Thus, when the armature 11 and the drum 17 are operated in a clockwise direction, the electrode 4 is raised from the path of material 3 and, when the armature and the winding drum are located in a counter-clockwise direction, the electrode is lowered in the furnace.

A main control magnet 23 is provided for operating the switches 15 and 16 in accordance with the current flowing through the electrode 4. The main magnet embodies a winding 24, which is connected to the three-phase supply conductor 7 by means of a transformer 25, and a core armature 26 which is operated in accordance with the energization of the winding 24. The winding 24 is provided with three taps 27, 28 and 29, for a purpose to be hereinafter set forth, and the core armature 26 is provided with a dash pot 30 for adjusting the speed of its operation. The core armature is pivotally connected to a contact arm 31 which has a fulcrum at 32 and carries a main contact member 33. The main contact member 33 selectively engages two contact members 34 and 35 according to the operative position of the main magnet.

The switch 15 comprises a winding 36, which is connected across the supply conductors 13 and 14 upon engagement between the contact members 33 and 35, and a core armature 37 which controls the operation of two switch members 38 and 39 and two interlock switch members 40 and 41. The two switch members 38 and 39 connect the armature 11 across the supply conductors 13 and 14 for operating the motor 10 in a clockwise direction to raise the electrode 4 from the bath of material 2. The interlock switch member 40 serves, upon operation of the switch 15, to short-circuit that portion of the winding 24 which obtains between the taps 27 and 28.

The switch 16 comprises a winding 42, which is connected across the supply conductors 13 and 14 upon engagement between the contact members 33 and 34, and a core armature 43 which controls the operation of two switch members 44 and 45 and two interlock switch members 46 and 47. The two switch members 44 and 45 connect the armature 11 across the supply conductors 13 and 14 for operating the motor 10 in a counterclockwise direction to lower the electrode 4 in the furnace. The interlock switch member 46 serves to open the short circuit which normally obtains across that portion of the winding 24 which is included between the taps 28 and 29 in order to prevent any hunting action upon operation of the switch 16. The interlock switch members 41 and 47, upon de-energization of the two switches 15 and 16, complete an energizing circuit for a brake relay 48 from the supply conductors 13 and 14. The brake relay 48, when operated, serves to complete a dynamic-braking circuit from the armature 11 through a resistor 49.

A switch mechanism 50 is provided for opening the circuit of the motor 10 in case any slack occurs in the cable 19 during the operation of the furnace. The switch mechanism 50 comprises an angle arm 51 which is pivotally mounted at 52 and carries a roller 53 that is held in engagement with the cable 19 by means of a spring 54. The arm 51 also carries a contact member 55 which is normally held in engagement with a contact member 56 when the cable 19 is free from any slack. The contact members 56 and 55 are so connected in circuit with the energizing circuits of the switches 15 and 16 as to release such switches in case any slack occurs in the cable 19. Thus, in case the electrode 4 is being lowered in the furnace and is so supported mechanically, either by the charge or by the roof, as to produce slack in the cable 19, the contact members 55 and 56 are separated by the spring 54, and the circuit of the winding 42 is broken for releasing the switch 16 to prevent further operation of the electrode motor.

The electrode frame 18 is provided with a projection 57 for operating switches 58 and 59 in the extreme positions of the electrode. The switches 58 and 59 are so connected, in the energizing circuits of the switches 15 and 16, as to prevent further operation of the motor 10 when the electrode is moved to an extreme position. Thus, when the electrode 4 is raised to an extreme position, the switch 58 is opened by the projecting piece 57 for releasing the switch 15 to stop the motor and, when the electrode 4 is lowered to an extreme position, the switch 59 is opened for releasing the switch 16 to de-energize the motor.

If current above normal value flows through the electrode 4, the main control electromagnet 23 is operated to effect engagement between the contact members 33 and 35. Upon engagement between the contact members 33 and 35, a circuit is completed through the winding 36 for operating the switch 15. Thereupon, the armature 11 is connected across the supply conductors 13 and 14 for operating the motor 10 in a clockwise direction to raise the electrode 4 from the bath of material 3 and, consequently, to reduce the current traversing the electrode circuit. Simultaneously with the operation of the motor 10, the interlock switch member 40 short-circuits that portion of the winding 24 which is included between the taps 27 and 28 for changing the setting of the main magnet 23 to prevent any hunting action. For a complete description of the means for preventing any hunting action, reference may be had to my co-pending application Serial No. 287,612, filed April 4, 1919, and assigned to the Westinghouse Electric & Manufacturing Company.

If current below normal value flows through the electrode 4, the contact arm 31 is operated by the main magnet 23 to effect engagement between the contact members 33 and 34. Upon engagement between the contact members 33 and 34, a circuit is completed through the winding 42 for operating the switch 16. Thereupon, the armature 11 is connected across the supply conductors 13 and 14 for operating the motor in a counterclockwise direction to lower the electrode 4 in the furnace. The interlock switch member 46 is operated, simultaneously with the motor 10, for opening the short circuit which normally obtains across that portion of the winding 24 which is included between the taps 28 and 29. Thus, the setting of the main magnet is changed to prevent any hunting action.

It is to be understood that the means illustrated for stopping the operation of the electrode motor, whenever a slack occurs in the cable 19 and whenever the electrode is moved to an extreme position, is diagrammatic only and any other well known means may be provided for performing such function.

Modifications in the system and in the arrangement and location of parts may be made within the spirit and scope of my invention and such modifications are intended to be covered by the appended claims.

I claim as my invention:

1. In a furnace-regulator system, the combination with a movable electrode, and a motor for operating the electrode, of means for stopping the motor in case the electrode is raised above or is lowered below a predetermined point or in case the movement of the electrode is arrested.

2. In a furnace-regulator system, the combination with a movable electrode, and a motor for raising and lowering the electrode to maintain a constant electrode arc, of means for preventing operation of the motor in case the electrode is raised above, or is lowered below, a predetermined point, and means for stopping operation of the motor in case movement of the electrode is stopped.

3. In a furnace-regulator system, the combination with a movable electrode, a motor for raising and lowering the electrode, and a cable for mechanically connecting the motor to the electrode, of means, comprising a switch, for opening the motor circuit if the cable becomes slack, means, comprising a second switch, for opening the motor circuit if the electrode is raised above a predetermined point, and means for opening the motor circuit if the electrode is lowered below a predetermined point.

4. In a furnace-regulator system, the combination comprising a movable electrode, a motor for raising and lowering the electrode, a cable for connecting the motor to the electrode, and means for controlling the motor in accordance with the value of the current flowing through the electrode and for preventing hunting action, of means for preventing operation of the motor if the cable becomes slack, and means for preventing operation of the motor if the electrode is raised above, or is lowered below, a predetermined point.

5. In a furnace-regulator system, the combination comprising a movable electrode, control means for raising and for lowering said electrode in accordance with the value of the current flowing through the electrode, and means for preventing operation of said control means if the electrode is moved beyond a predetermined point or if the movement of the electrode is arrested.

In testimony whereof, I have hereunto subscribed my name this 27th day of Oct. 1919.

CLARENCE A. BODDIE.